July 8, 1941.  T. R. MERTON  2,248,638
SHEET MATERIAL WITH PRISMATIC SURFACES
Filed Feb. 11, 1938
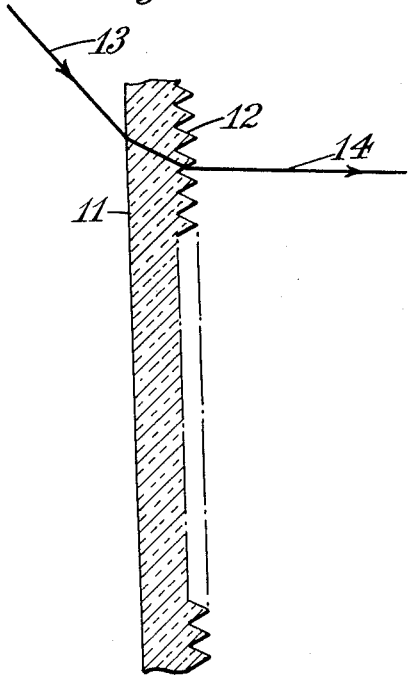
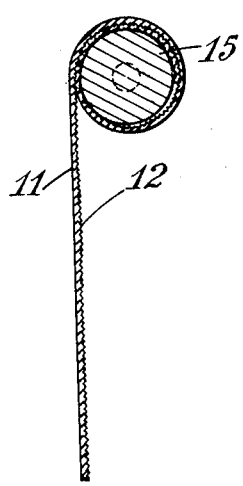
Inventor:
Thomas Ralph Merton,
by Stebbins, Blenko & Parmelee,
attys.

Patented July 8, 1941

2,248,638

UNITED STATES PATENT OFFICE 2,248,638

SHEET MATERIAL WITH PRISMATIC SURFACES

Thomas Ralph Merton, Hereford, England

Application February 11, 1938, Serial No. 190,129
In Great Britain February 22, 1937

4 Claims. (Cl. 156—10)

This invention comprises improvements in or relating to sheet material with prismatic surfaces.

It is known to cast or mould glass sheet with a surface configuration consisting of a series of contiguous prismatic ribs arranged in a substantially parallel formation. Such ribbed glass is commonly employed in glazing windows of rooms and buildings to deflect light entering the window through an angle so that the interior of the room or building may be illuminated by light rays coming from a direction nearer to the zenith than would otherwise occur.

Windows glazed with ribbed prismatic glass show, however, a marked tendency to collect dust and, owing to the more or less permanent nature of the glazing it is difficult to change over, from time to time, as may be desired to suit varying external lighting conditions, from a window comprising clear glass to one glazed with the prismatic ribbing.

The invention is not, however, limited to its application to transparent material, as will hereinafter appear.

The invention accordingly comprises sheet material carrying a multiplicity of light-deflecting prismatic elements, characterised by the fact that the sheet material is thin and flexible and that the prismatic elements carried thereby are minute, whereby the material may be rolled up or otherwise packed away in a convenient manner or extended as a sheet as may be desired.

If the light-deflecting prismatic elements have a reflecting surface they may be disposed at such an angle as to deflect incident light to one side of the normal path of reflection, in a desired direction and such a reflecting surface on flexible material is within the scope of the present invention. If a reflector has a surface which is composed of a number of elements which are all inclined similarly to the general plane of the surface, the optical properties of the system as a whole will be such that when light falls upon it the greater part will be reflected as if it were incident upon and reflected from a plane surface making an angle with the general plane equal to the angle which the individual surfaces of the elements make with the general plane.

Preferably, the individual prismatic elements are arranged as a plurality of contiguous ribs in parallel formation after the manner of the prismatic ribbed glass of the kind described, but according to the invention the individual prismatic elements are so minute that they are not readily discernible by the naked eye, yet are not so small as to give any conspicuous colour dispersion by diffraction. The individual prismatic elements may each be of the order of 0.2 to 0.02 millimeter in width.

Material according to the invention may be employed in the form of a sheet attached to a roller so as to be capable of use as a roller blind. If rolled-up the ribbed surface will be protected from dust and dirt and it can be unrolled for use as desired. If the material is of a transparent substance the prismatic elements act as refractive prisms for transmitted light and in that case the use of a roller blind will permit the material to be mounted above a window and unrolled to deflect light as it enters the room or rolled-up as may be desired.

The following is a description, by way of example, of specific embodiments of the invention, reference being made to the accompanying drawing, in which:

Figure 1 is a vertical section through a portion of material according to the invention upon an enlarged scale;

Figure 2 is a diagrammatic representation of a roller blind.

Referring to the drawing, Figure 1, 11 represents transparent sheet material which may, for example, be of Celluloid and which in the figure is shown greatly enlarged. The actual thickness in practice would be less than 1/100th of an inch. The surface of this material is covered with a large number of parallel prismatic ribs 12. As shown in the drawing the sides of the ribs are inclined at 60° to the plane of the material so that light entering, say along a line 13, will be deflected by the prismatic formation of the ribs and emerge along the line 14. The spacing of the ribs in the example shown is about 1/500th of an inch, that is to say 1/20th of a millimeter and with this dimension the ribs individually will not be visible to the naked eye.

Referring to Figure 2, this shows the material 11, having the ribs 12, wound on a roller 15 for use as a blind.

Referring now to the method of production of the ribbed material this may follow the methods described in prior United States patent application No. 116,662, now patented, No. 2,232,551 and dated Feb. 18, 1941, but instead of employing a diffraction grating as the original surface there is employed a grating of metal which is ruled with facets similar to those which it is desired to reproduce in the material 11. The master grating is first prepared by ruling a suitable base, for example a metallic base such as gilded copper, with ribs by a diamond on a dividing engine. Casts are taken off this in cellulose acetate as described in the aforesaid patent application and employed, juxtaposed as dies, for moulding an area of a larger size than the original master grating in hardened gelatine. The hardened gelatine is then used for the reproduction of the material in Celluloid, cellulose acetate, regenerated cellulose or other substance as described in my aforesaid patent application.

Instead of ruling a flat master grating by means of a dividing engine it is possible to prepare a cylindrical master grating by turning prismatic grooves on the surface of a master cylinder.

Materials coming more particularly into consideration for the production of the flexible ribbed sheet material, according to the present invention, are cellulosic materials, such as cellulose acetate, or other cellulose esters or ethers, alginic materials and synthetic resins. Whilst it is preferred that the finished product should be uncoloured so as to transmit the whole spectrum of white light, it may in some instances be desirable to employ a coloured material for the production of certain decorative effects.

It will be appreciated that the angles of the prisms may be any desired to secure the optical effect required and it is not necessary that they should be symmetrical as illustrated in Figure 1. For example one useful form is that in which one face of the ribs is at right angles to the plane of the material and the other face is inclined at an angle of 45° to the said plane, so that the material shows in cross-section a saw-tooth reticulation.

I claim:

1. A roller blind comprising thin flexible sheet material having thereon a multiplicity of light deflecting prismatic elements distributed over one of its surfaces, the prismatic elements being so minute as not to be readily individually observable by the naked eye, the material being transparent so that the prismatic elements act as refractive prisms for transmitted light.

2. A roller blind as described in claim 1, the prismatic elements being arranged to form parallel ribs of minute pitch from rib to rib.

3. A roller blind for deflecting light as described in claim 1, the other surface of said sheet material being smooth.

4. A roller blind as described in claim 1, in which the prismatic elements are of the order of from 0.2 to 0.02 of a millimeter in width.

THOMAS RALPH MERTON.